United States Patent
Kontschak et al.

(10) Patent No.: US 9,752,921 B2
(45) Date of Patent: Sep. 5, 2017

(54) MODULAR WEIGHING SCALE THAT ALLOWS A WEIGHING CELL TO BE MOUNTED INSIDE A BASE IN TWO DIFFERENT ORTHOGONAL ORIENTATIONS

(71) Applicant: Mettler-Toledo (Albstadt) GmbH, Albstadt (DE)

(72) Inventors: Dieter Kontschak, Winterlingen (DE); Walter Holike, Geislingen (DE); Xinwei Su, Jiangsu (CN); Holger Moritz, Albstadt (DE); Walter Ehresmann, Albstadt (DE); Edgar Kempf, Inzigkofen (DE)

(73) Assignee: METTLER-TOLEDO (ALBSTADT) GMBH, Albstadt (DE)

( * ) Notice: Subject to any disclaimer, the term of this patent is extended or adjusted under 35 U.S.C. 154(b) by 159 days.

(21) Appl. No.: 14/863,638

(22) Filed: Sep. 24, 2015

(65) Prior Publication Data

US 2016/0084698 A1    Mar. 24, 2016

(30) Foreign Application Priority Data

Sep. 24, 2014 (EP) .................................. 14186074

(51) Int. Cl.
| | |
|---|---|
| *G01G 19/18* | (2006.01) |
| *G01G 21/23* | (2006.01) |
| *G01G 21/28* | (2006.01) |

(52) U.S. Cl.
CPC ............. *G01G 19/18* (2013.01); *G01G 21/23* (2013.01); *G01G 21/28* (2013.01)

(58) Field of Classification Search
CPC ......... G01G 19/18; G01G 21/23; G01G 21/28
See application file for complete search history.

(56) References Cited

U.S. PATENT DOCUMENTS 7,022,921 B2 * 4/2006 Petrotto ................. G01G 19/44
                                                        177/144

FOREIGN PATENT DOCUMENTS

| GB | 2 229 823 A | 10/1990 |
| JP | 2010-96502 A | 4/2010 |

* cited by examiner

*Primary Examiner* — Randy Gibson
(74) *Attorney, Agent, or Firm* — Standley Law Group LLP

(57) ABSTRACT

A weighing scale (30a, 30b, 40, 50) is designed for use in a first and a second configuration. In the first configuration, a base unit (1) has a main plane disposed horizontally with a load receiver (32, 42, 52) extending parallel thereto. A weighing cell (2) is mounted under the load receiver in the base unit and measures a weighing force acting perpendicular to the main plane. In the second configuration, the main plane is disposed vertically, with the load receiver hanging below the base unit as a suspended weighing pan, with the weighing cell mounted in the base unit to measure a vertical weighting force that is parallel to the main plane of the base unit.

16 Claims, 3 Drawing Sheets

MODULAR WEIGHING SCALE THAT ALLOWS A WEIGHING CELL TO BE MOUNTED INSIDE A BASE IN TWO DIFFERENT ORTHOGONAL ORIENTATIONS

CROSS-REFERENCE TO RELATED APPLICATIONS

This application is entitled to the benefit of a right of priority under 35 USC 119 from European application 14186074.2, filed 24 Sep. 2014. The content of that application is incorporated by reference as if fully recited herein.

TECHNICAL FIELD

This disclosure concerns a housing for a weighting scale, and particularly, a housing The invention concerns a weighing scale for use in retail stores or in industrial applications with a capacity range of typically up to 30 kilograms. The principal constituent parts of this type of scale typically include a base unit carrying a load-receiving plate, at least one display unit that may be incorporated in or attached to the base unit or mounted at an elevated position on a display column, and also a label printer. Some scales have a load-receiving plate or weighing pan that is suspended from an elevated base unit, with a display that is incorporated in the base unit.

According to their different configurations, there are three distinct types of scales within the category of weighing devices that the invention relates to. They will be referred to herein as counter scales, compact scales, and suspension scales.

Under this terminology, a counter scale is a scale that is configured for use on a table or counter of normal height, with the base unit resting on the counter surface and a display unit supported by a column that can be attached to the base unit. In a retail scale, the display unit can have a primary display in the form of a keyboard/display panel or a touch screen facing towards the operator of the scale and a secondary display facing towards the customer. Configurations with two separate display units, i.e. a keyboard/display unit or a touch screen unit for the operator and a basic display unit facing towards the customer, are also possible. In addition, a label printer may be attached to the base unit, to a display unit, or standing by itself as a separate unit.

A compact scale is designed for use at a more elevated position than the counter scale, usually on top of a glass display case in which the food items that are sold by weight, such as meat, seafood, cheese, pastries, etc., are laid out so that they can be viewed by the customer. The compact scale owes its name to its compact configuration, wherein the operator keyboard/display unit or touch screen and possibly a printer as well as the customer display are integrally incorporated on the respective opposite sides of the base unit. Alternatively, the display units and the printer could also be designed as separate units that are closely attached to the outside of a base unit of a compact scale.

Suspension scales are used primarily in cases where a stable and level surface on which to set a counter scale or a compact scale is not available. The base unit of a suspension scale, which normally includes an integrally incorporated or closely attached display, is suspended for example from the ceiling, with the display about at eye level for the average user and with a load carrier, e.g. in the form of a shallow weighing pan, hanging from a suspension hook or similar load-coupling device which is connected to a load sensor inside the base unit. A typical use for a suspension scale is for example in an outdoor market where the scale can be suspended from the roof frame of a market stall.

A retail scale may also be configured for self-service, where the customer weighs the merchandise and may also print the label for it. In this case, the scale will only have one display, either a display/keyboard unit or a touch screen.

Because of this diversity of configurations and variations of retail scales that are used in different applications, manufacturers, distributors and servicers of retail scales have to offer and maintain a wide range of retail weighing equipment with the corresponding inventory of spare parts. Consequently, there is a need to simplify the logistics of manufacturing, distributing and servicing retail scales. With the aim of meeting this need, the focus of the present invention is in particular on a modular concept for retail scales, wherein among the aforementioned major constituent parts at least the base unit would be configured as a universal module that could be shared between the different types of scales. Thus, for example a scale distributor would be able to offer counter scales, compact scales as well as suspension scales while stocking only a single type of base module. Of course, it may still be necessary for example to offer base modules with different weighing capacities and display divisions, for example 30×0.005 kg, 12×0.002 kg, etc. Nevertheless, the number of different base modules to keep in inventory would be reduced by a factor of three, if the same module could be used in a counter scale, in a compact scale, and in a suspension scale.

It should be mentioned that the term "weigh module" which is well known and widely used in the field of weighing technology relates to a different concept than the term "base module". A weigh module, as the term is generally understood, is a force sensor with associated force-introduction mechanism designed as a complete assembly module. For example, a plurality of weigh modules may be used to support the load platform of a vehicle scale, the tank of a tank scale, or the hopper of a hopper scale.

A scale, which is described in GB 2229823 (A) as "an apparatus for weighing and pricing goods purchased in a shop such as a supermarket", can be set up in a first configuration where the body of the scale that contains the weight sensor stands on a table or counter and carries a load-receiving plate on top, and also in a second configuration as a suspension scale with a weighing pan suspended from the underside of the scale body. To convert this scale from the first to the second configuration, the load plate is removed from its support member, which—by way of a passage opening in the top of the scale housing—is solidly connected to a strain gauge load cell. The support member is then connected to a vertical suspension rod or column which, in turn, is attached to the ceiling or a supporting structure above the scale. The feet are removed from the underside of the scale housing, and a suspended weighing pan is attached to the bottom of the scale housing at a point in the vertical extension of the aforementioned suspension rod. Through this conversion, the force introduced into the load cell is reversed from a downward-pushing force to an upward-pulling force. The reversal of direction of the force is compensated by switching the polarity of the Wheatstone bridge circuit of the strain gauge load cell.

However, the concept of GB 2229823 (A) would be impossible to realize in a scale base unit with the size and proportions of a modern retail scale. The base units of retail scales, counter scales as well as compact scales, typically have the proportions of a low-profile cuboid, i.e. a flat rectangular block whose largest dimensions extend horizontally and approximately match the likewise rectangular load-receiving plate. The base unit of a suspension scale on the other hand should have at least one large vertical surface on which the weight display is incorporated. In the concept of GB 2229823 (A), the same scale body in the same orientation is used for both the top-loading and the suspended-load configuration and, consequently, this concept cannot simultaneously be compatible with the design requirements for a flat, low-profile base unit of a counter scale or compact scale and a base unit for a suspension scale whose largest surface should lie in a vertical plane.

The invention therefore has the objective to provide a weighing scale whose base unit and, if possible, other constituent parts are designed as modules from which the scale can be assembled in different configurations including a counter scale in which a load receiving plate is arranged on top of the base unit and at least one display unit is mounted on a column, a compact scale in which a load receiving plate is arranged on top of the base unit and at least one display unit is directly attached to the base unit, and a suspension scale in which a load receiving weighing pan is suspended from the base unit. In each of the configurations, i.e. as a counter scale, a compact scale, and a hanging scale, the weighing scale should have a layout and proportions that make the scale practical and aesthetically attractive to the user.

SUMMARY

This task is solved by a modular scale with the features according to the independent main claim 1. Further configurations and embodiments of the subject of the invention are presented in the subordinate claims.

A modular weighing scale of the kind to which this invention relates includes an enclosed base unit, a weighing cell arranged inside the base unit, and a load receiver arranged outside of the base unit and connected to the weighing cell through at least one passage opening in the base unit. The outside of the base unit is delimited by two opposite, substantially planar and parallel main surfaces whose dimensions in their surface planes are larger than the perpendicular distance between the surface planes, and by a circumference surface that is substantially perpendicular to the main surfaces. In particular according to the invention, the base unit is designed as a module that is operable selectively in a first position and in a second position.

In the first position, the main surfaces are disposed horizontally, with one of the main surfaces forming a bottom of the enclosure, the other of the main surfaces forming a top of the enclosure, the load receiver extends as a substantially horizontal platform over the top of the enclosure, and the weighing cell is mounted inside the enclosure in a first orientation in which the weighing cell measures a weighing force in the direction perpendicular to the main surfaces, which is acting through a carrier member which connects the load receiver to the weighing cell by way of one or more first passage openings in the top of the enclosed base unit.

In the second position, the main surfaces of the base unit are disposed vertically, one of the main surfaces forming a front and the other forming a back of the enclosed base unit, the load receiver hangs below the base unit as a suspended weighing pan, and the weighing cell is mounted inside the base unit in a second orientation in which the weighing cell measures a weighing force in a direction parallel to the main surfaces, which is acting through a suspension member which connects the suspended load receiver to the weighing cell by way of a second passage opening in a downward-facing part of the circumference surface.

With the base unit in the first position, the modular weighing scale of the foregoing description can be set up, for example, as a retail counter scale with an attached column carrying a keyboard/display panel or a touch screen panel facing the operator and an additional data display panel facing the customer. Alternatively, again with the base unit in the first position, the modular weighing scale of the foregoing description can be set up, for example, as a compact retail scale with a keyboard/display panel or a touch screen panel attached directly to the operator side of the base unit and an additional data display panel attached to the customer side of the base unit.

With the base unit in the second position, the modular weighing scale of the foregoing description can be set up as a hanging scale, where the base unit would for example be hung from the ceiling and the load receiver would be suspended from the base unit, while the operator panel and the customer display panel would be attached to the large main surfaces of the base unit.

In either of the two positions of the base unit, the modular scale according to the invention meets the applicable ergonomic and aesthetic design requirements. In the first position, the base unit meets the requirement for a low height of the load receiver platform above the counter surface or display-case surface on which the base unit is standing. In the second position, the base unit meets the requirement for large vertical surfaces on which the operator panel and the customer display panel can be attached.

Advantageously, the base unit includes provisions whereby standing feet which can be attached to the bottom of the base unit when the latter is set up in the first position, where the base unit rests on a substantially horizontal supporting surface with the load receiver arranged on top of the base unit. Likewise the base unit advantageously includes provisions whereby the base unit, when set up in the second position, can be connected to a supporting member which supports the base unit in an elevated position with the load receiver suspended from the base unit. The supporting member can for example be a vertical road through which the base unit is solidly connected to the ceiling, or the supporting member can be a cantilever support bracket through which the base unit is supportively connected to a building wall at an appropriate distance from the latter.

In preferred embodiments of the modular weighing scale, the base unit has the shape of a flat rectangular block delimited essentially by two plane rectangular main surfaces and four plane rectangular side surfaces forming a circumference wall.

In an alternative embodiment, the base unit may have the shape of cylinder delimited essentially by two circular main surfaces and a cylindrically curved continuous circumference wall.

Advantageously, the base unit has a first weighing-cell-mounting location in a central area of the base unit, where the weighing cell can be mounted in the first orientation when the base unit will be used in the first position, and a second weighing-cell-mounting location near the second passage opening in the circumference wall, where the weighing cell can be mounted in the second orientation when the base unit will be used in the second position.

In a particularly preferred embodiment, the base unit has a single weighing-cell-mounting location near the second passage opening in the circumference wall, where the weighing cell can be mounted in the first orientation when the base unit is to be set up in the first position and in the second orientation when the base unit is to be set up in the second position.

The modular weighing scale in preferred embodiments further includes an operator control unit with a data display device and a data entry device and is advantageously equipped with mechanical and/or electrical means for selectively connecting the operator control unit to the base unit in the first or in the second position of the latter.

The modular weighing scale in preferred embodiments further includes an additional data display unit and is advantageously equipped with mechanical and/or electrical means for selectively connecting the additional data display unit to the base unit in the first or in the second position of the latter.

In advantageous embodiments of the modular weighing scale, the mechanical and/or electrical connecting means includes a column to support the operator control unit and/or the additional data display unit at a vertically elevated position from the base unit in its first position, and the base unit has a column-mounting location where the column carrying the operator control unit and, if applicable, the additional data display unit can be mechanically and electrically connected to the base unit.

Alternatively the column that supports the operator control unit and/or the additional data display unit is standing independently of the base unit, and the latter has an electrical connector device where the operator control unit and/or the additional data display unit that are supported by the column can be electrically connected to the base unit.

In a configuration of the modular weighing scale where the base unit is set up in its first position, an operator control unit can be mechanically and electrically attached directly to the base unit at a first mounting location of the base unit, and an additional data display unit can be mechanically and electrically attached directly to the base unit at a second mounting location of the base unit.

In a configuration of the modular weighing scale where the base unit is set up in its second position, an operator display unit and an additional data display unit can be arranged, respectively, on the opposite main surfaces of the base unit through appropriate further electrical and mechanical connections.

Preferred embodiments of the modular weighing scale according to the invention may further include a printer. With the base unit set up in its first position, the printer can be selectively arranged as a free-standing unit with an electrical connection to the base unit or as an attached unit with a mechanical and electrical connection to the base unit by way of the column. When the base unit is set up in its second position, the printer can be arranged as an attached unit with a direct mechanical and electrical connection to the base unit.

The modular weighing scale advantageously includes a space for a removable counterweight arranged inside the base unit at a peripheral location opposite the column-mounting location. When the base unit is set up in its first position and a column carrying an operator control unit is attached to the base unit, the counterweight serves to enhance the stability of the modular weighing scale against tipping over, for example if an operator pushes the keys or touch fields on the operator control unit too forcefully.

In other setups of the modular weighing scale, where the counterweight is not used, the vacant space can serve as a routing path for one or more electrical cables connecting the base unit to the operator control unit and/or to a printer. Also, the counterweight occupies the space which, in the second position of the base unit, is traversed by the suspension member that is attached to the weighing cell in order to suspend the load receiver. Thus, at least in the second position of the base unit, the counterweight needs to be removed to make way for the suspension member.

BRIEF DESCRIPTION OF THE DRAWINGS

Details of the modular weighing scale of the invention are explained in the description of the examples that are illustrated in the drawings, wherein.

DETAILED DESCRIPTION

Figure 1:
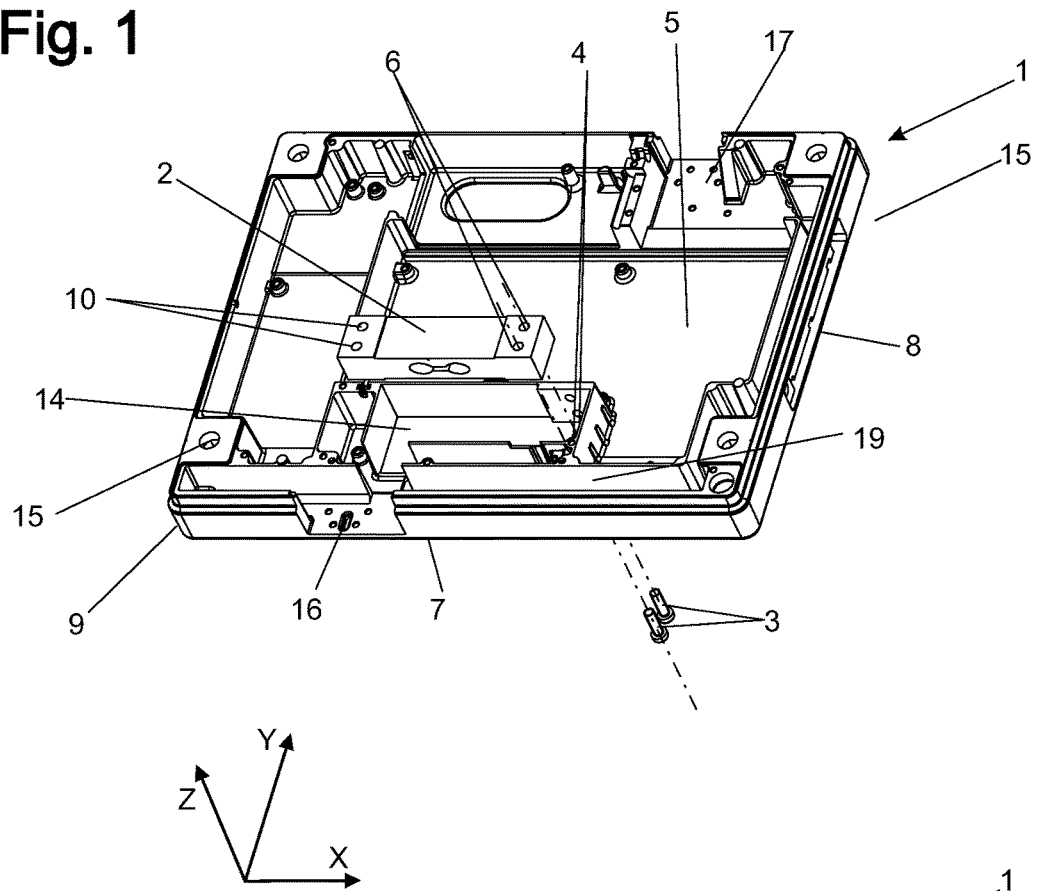
FIG. 1 represents an exploded view of the uncovered base unit of a modular weighing scale of the invention with a weighing cell ready to be mounted in the first orientation.
Figure 2:
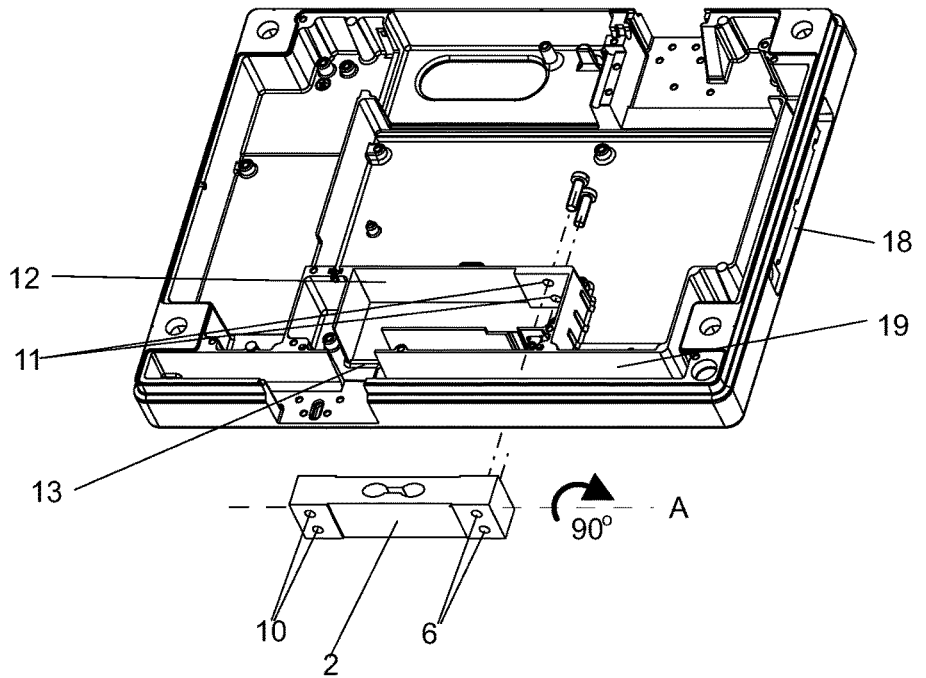
FIG. 2 represents an exploded view of the uncovered base unit with the weighing cell ready to be mounted in the second orientation.

FIG. 1 shows an exploded view of the uncovered and empty base unit 1 of a modular weighing scale according to the invention, more specifically the chassis base 1 or enclosure bottom of the base unit, with a strain gauge weighing cell 2 ready to be installed by means of the two screws 3 which will be inserted through two clearance holes 4 in the bottom 5 of the chassis base 1 into the mounting holes 6 of the weighing cell 2. For reference purposes, an x-y-z coordinate system is shown in FIGS. 1 and 2, wherein x is oriented parallel to the longest edge 7, y is oriented parallel to the second-longest edge 8, and z is oriented parallel to the shortest edge 9 of the base unit, which is shaped essentially with the outlines of a flat rectangular block. The weighing cell 2 in FIG. 1 is about to be mounted in what has been defined above as the first orientation, where the weighing cell 2 measures a force in the negative z-direction, i.e. perpendicular to the x-y plane or main plane of the base unit 2. A carrier member (not shown), which will reach through a passage opening in an enclosure top (not shown) of the base unit 1 and support the load receiver 32, 42 (see FIGS. 3 and 4), will be bolted to the fastening holes 10 of the weighing cell 2.

FIG. 2 shows again the base unit of FIG. 1. The weighing cell 2 is positioned for installation by means of the two screws 3 which, in contrast to FIG. 1, will now be inserted through two clearance holes 11 in an interior partitioning wall 12 of the chassis base 1. The weighing cell in FIG. 2 is about to be mounted in the second orientation, where the weighing cell 2 measures a force in the negative y-direction, i.e. in a parallel direction to the main plane of the base unit. A suspension member 53 (see FIG. 5), which will reach through a passage opening 13 in the side wall of the chassis base 1 nearest to the weighing cell 2 and hold the suspended load receiver 52, will be attached to the fastening holes 10 of the weighing cell 2.

Figure 3A:
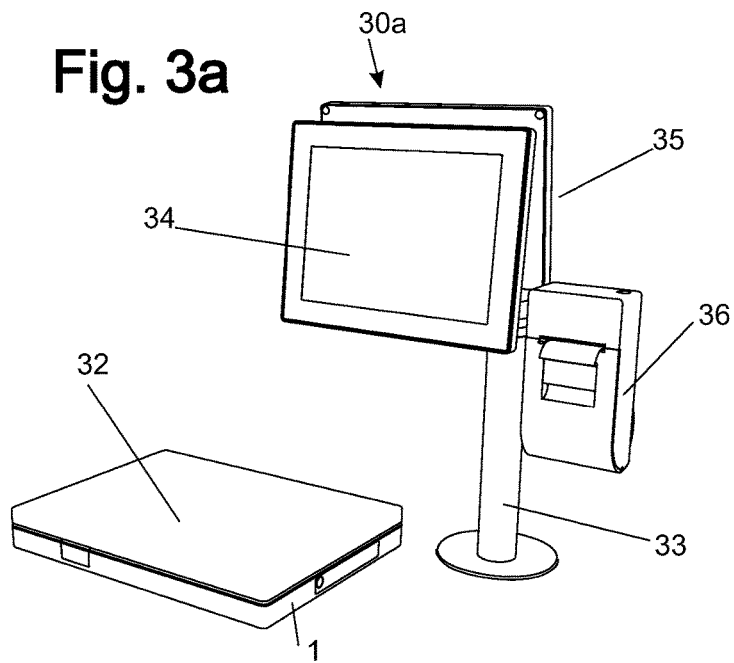
FIG. 3*a* shows the modular scale of the invention set up as a counter scale with a separate display column and a printer attached to the display column.
Figure 3B:
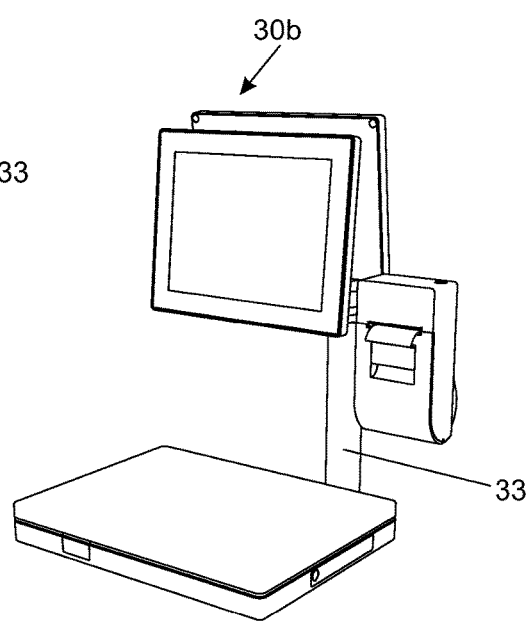
FIG. 3*b* shows the modular scale of the invention set up as a counter scale with an attached display column and a printer attached to the display column.
Figure 4:
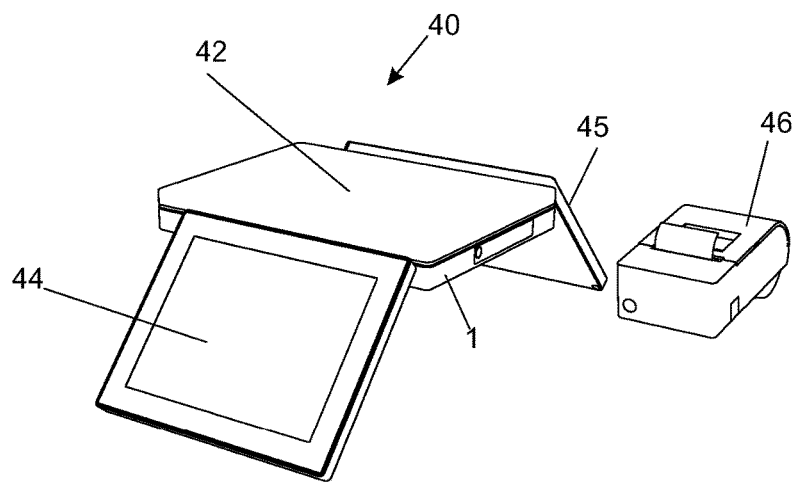
FIG. 4 shows the modular scale of the invention set up as a compact scale with a free-standing printer.
Figure 5:
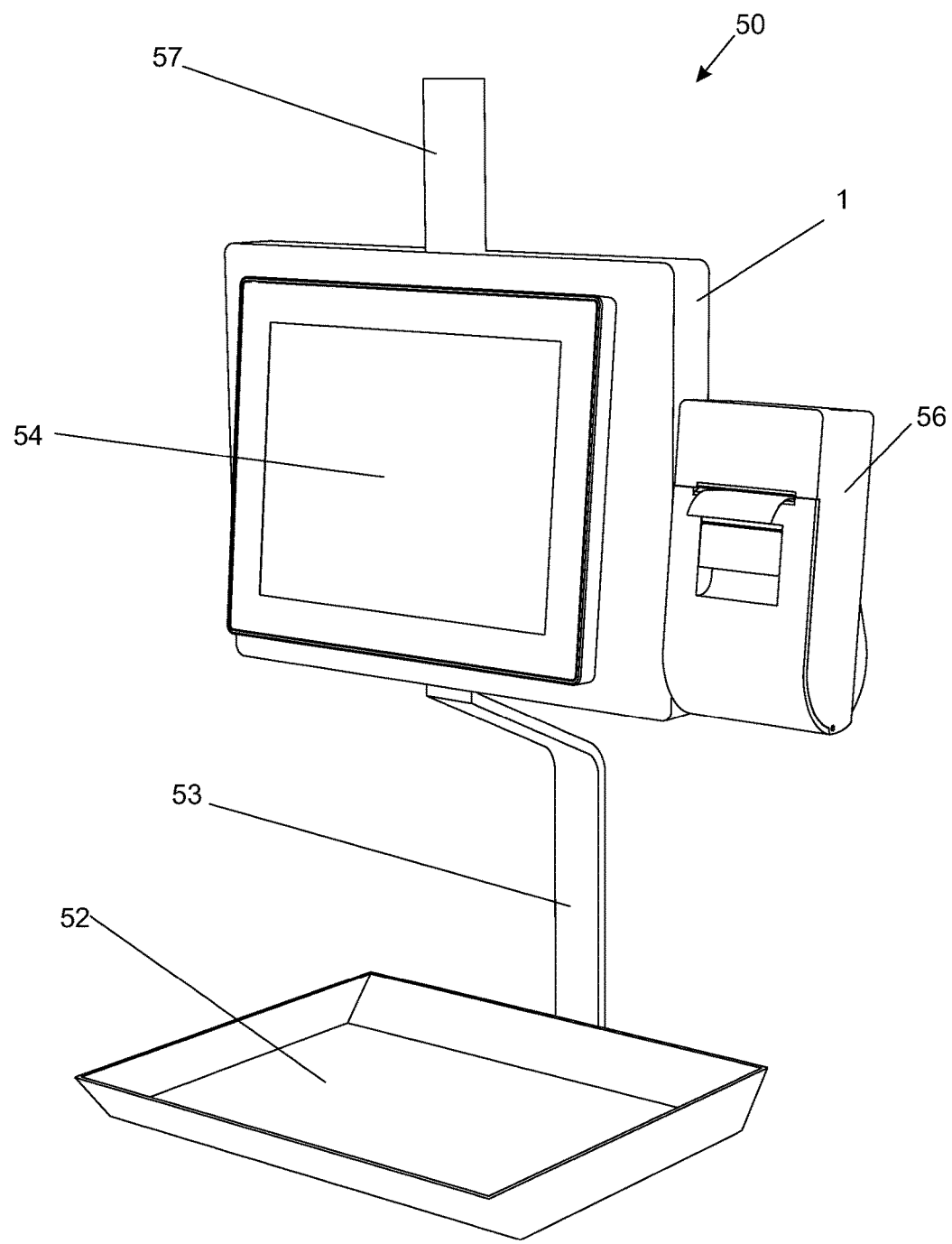
FIG. 5 shows the modular scale of the invention set up as a hanging scale with a printer attached to the base unit.

FIGS. 1 and 2 illustrate how the same base unit 1 can be assembled for use in the two positions described herein-above, i.e. a first position where the weighing cell 2 is installed in the first orientation (FIG. 1) and the base unit 2 can be used in a counter scale 30*a*, 30*b* (FIGS. 3*a* and 3*b*) or in a compact scale 40 (FIG. 4), and a second position where the weighing cell 2 is installed in the second orientation (FIG. 2) and the base unit 2 can be used in a hanging scale 50 (FIG. 5).

The chassis base 1 of FIGS. 1 and 2 has one weighing-cell-mounting location in the form of a chamber 14, where the weighing cell can be mounted in two orientations that are rotated by 90° relative to a longitudinal axis A of the weighing cell 2. However, it is also conceivable to provide two locations for mounting the weighing cell on the chassis base, for example a first location in a central area of the chassis base 1 where the weighing cell 2 could be installed in the first orientation and a second location in a peripheral area of the chassis base 1 where the weighing cell could be installed in the second orientation. A design with a first weighing-cell-mounting location in a central area of the chassis base 1 could be selected for example in order to achieve a more centered introduction of the weight force into the weighing cell 2.

While the appearance of the weighing cell 2 shown in FIGS. 1 and 2 suggests a strain gauge load cell of the so-called cantilever beam configuration, it should be noted that any kind of weighing cell operating according to any kind of force-sensing principle could be used as long as it can be produced as a compact module which can be mounted in the two orientations inside a scale base unit with a flat profile.

Also, while all of the FIGS. 1 to 5 show examples of a base unit 1 with a rectangular footprint, other contour shapes of the base unit are certainly possible, for example a base unit in the shape of a low-profile circular cylinder.

In FIG. 1, which shows the chassis base 1 with the weighing cell 2 in the process of being set up for use in the first position, i.e. as a counter scale 30*a*, 30*b* (see FIGS. 3*a*, 3*b*) or a compact scale 40 (see FIG. 4), the edge 7 closest to the viewer (the lower edge of the chassis base in the drawing) represents the operator side. Accordingly, in the case of a retail store scale, the opposite side would represent the customer side of the scale.

Other features of interest that can be seen in FIGS. 1 and 2 include mounting locations 15 for fixed or adjustable feet (not shown in the drawings), as well as mounting locations 16 and 17 for, respectively, an operator panel and an additional customer display panel (in a configuration as a compact retail scale), and a mounting location 18 for an attached printer (in a configuration as a hanging scale, as shown in FIG. 5). In the case of a counter scale 30*b* with an attached display column (FIGS. 1 and 3*b*), the latter would be installed at the mounting location 17 on the customer side of the chassis base 1.

A channel-shaped compartment 19 on the operator side of the chassis base serves as the seat for a removable bar-shaped ballast weight (not shown in the drawings). When a display column is installed at the mounting location 17 on the customer side of the chassis base 1, the ballast weight on the operator side serves as a counterweight to enhance the stability of the counter scale 30*b* (see FIG. 3*b*) against tipping over, for example if an operator pushes the keys or touch fields on the operator control unit 34 too forcefully. When the base unit 1 is configured for a counter scale 40 or a hanging scale 50, i.e. without a display column, the ballast weight is taken out of the channel compartment 19. In a configuration of the modular scale as a compact scale (FIGS. 1 and 4), the vacated channel compartment 19 can be used for a cable to an operator display that is installed at the mounting location 16. In the configuration as a hanging scale (FIGS. 2 and 5), removing the ballast weight from the channel compartment 19 opens up the passage 13 for a suspension member 52 from the weighing cell 2 to the suspended load receiver 51.

FIGS. 3 to 5 show typical configurations that can be realized with the modular weighing scale according to the invention.

In FIGS. 3*a* and 3*b* the modular weighing scale is set up as a counter scale 30*a*, 30*b* with the base unit 1 assembled for use in the first position. The load receiver 32 is arranged on top of the base unit 1, supported by the weighing cell 2 which is installed in the first orientation inside the base unit 1. An operator panel 34, an additional data display panel 35 and a printer 36 are attached to a display column 33 which in the arrangement of FIG. 3*a* is installed separately on the same table or counter surface on which the base unit 1 is standing. In the arrangement of FIG. 3*b* the display column 33 is attached directly to the base unit 1 at the mounting location 17 of the latter.

FIG. 4 shows the modular weighing scale set up as a compact scale 40. The base unit 1 is again assembled for use in the first position, where the load receiver 42 is arranged on top of the base unit 1. The operator panel 44 and the additional data display panel 45 are attached directly to the base unit 1, and a printer 46 can be set up separately. In the configuration of FIG. 4, the base unit 1 would typically be set at a more elevated level, typically on top of a display case of the kind used, e.g., for meat, seafood, cheese, etc. The base unit 1 with the attached operator panel 44 and the additional data display panel 45 can in this case sit astride the display case with the operator panel 44 facing the vendor and the additional data display panel 45 facing the customer.

In FIG. 5, the modular weighing scale is set up as a hanging scale 50. The base unit 1 is assembled for use in the second position, where the base unit is, e.g. connected to the ceiling by way of a supporting member 57, the load receiver 52 is suspended from the base unit 1 by means of a suspension member 53, and the operator panel 54 and the additional data display panel (not visible in FIG. 5) are arranged on the now vertically oriented main surfaces of the base unit 1. A printer 56 can be attached to the base unit 1.

Although the invention has been described through the presentation of specific examples, it will be evident to the reader that numerous further variant embodiments could be developed from the teachings of the present invention, for example by combining the features of the individual embodiments with each other or by interchanging individual functional units of the individual embodiments against each other. Also, it should be emphasized that the invention is not limited to the shapes and proportions of the elements shown in the drawings, but that the inventive concept could be fully realized with shapes and proportions different from those shown in the illustrations.

What is claimed is:
1. A weighing scale, comprising:
   a base unit, configured as a module that operates in either a first or a second configuration, the base unit has a main plane, located in an x-y plane, that projects an outline in a z direction that is substantially larger than the outline projected by either the x or y direction;
   a weighing cell arranged inside the base unit; and
   a load receiver, arranged outside of the base unit and connected to the weighing cell through a passage opening in the base unit;

such that, in the first configuration:
the main plane is disposed horizontally;
the load receiver extends parallel to the main plane as a substantially horizontal platform above the base unit; and
the weighing cell is mounted inside the base unit in a first orientation in which the weighing cell measures a vertical weighing force acting in the z-direction of the base unit, the weighing cell connected to the load receiver through a carrier member that supports the load receiver from below, and in the second configuration:
the main plane is disposed vertically;
the load receiver hangs below the base unit as a suspended weighing pan; and
the weighing cell is mounted inside the base unit in a second orientation in which the weighing cell measures a vertical weighing force acting in a direction parallel to the main plane, the weighing cell connected to the load receiver through a suspension member that supports the load receiver from above.

2. The weighing scale of claim 1, further comprising:
standing feet, attached to mounting locations on the base unit, for setting the base unit as a substantially horizontal supporting surface with the load receiver arranged on top of the base unit, when in the first configuration; and
a supporting member, attached to the base unit, to support the base unit for operation on the second configuration with the load receiver suspended from the base unit.

3. The weighing scale of claim 2, wherein:
the base unit has the shape of a flat rectangular block delimited essentially by two plane rectangular main surfaces parallel to the main plane and four plane rectangular side surfaces standing perpendicular to the main plane, the four plane rectangular side surfaces forming a circumference wall.

4. The weighing scale of claim 2, wherein:
the base unit has the shape of cylinder delimited essentially by two circular main surfaces parallel to the main plane and a cylindrically curved continuous circumference wall standing perpendicular to the main plane.

5. The weighing scale of claim 1, further comprising:
a first weighing-cell-mounting location for mounting the weighing cell for use in the first configuration of the base unit; and
a second weighing-cell-mounting location for mounting the weighing cell for use in the second configuration of the base unit.

6. The weighing scale of claim 1, further comprising:
a single weighing-cell-mounting location, such that the weighing cell, mounted in a first orientation is operative in the first configuration of the base unit and, mounted in a second orientation, is operative in the second configuration of the base unit.

7. The weighing scale of claim 1, further comprising:
an operator control unit having a data display device and a data entry device, the operator control unit and the base unit each provided with means for selectively connecting, either mechanically or electrically, the operator control unit to the base unit in either the first or second configuration.

8. The weighing scale of claim 7, further comprising:
an additional data display unit, the base unit and the additional data display unit each provided with means for selectively connecting, either mechanically or electrically, the additional data display unit to the base unit in either the first or second configuration.

9. The weighing scale of claim 8, wherein:
the means for connecting to the base unit comprises a column to support, at a vertically elevated position from the base unit in the first configuration, at least one of the operator control unit and the additional data display unit, with the column being mechanically and electrically connected to the base unit at a column-mounting location of the base unit.

10. The weighing scale of claim 7, wherein:
the means for connecting to the base unit comprises a column to support, at a vertically elevated position from the base unit in the first configuration, at least one of the operator control unit and the additional data display unit, the column standing independently of the base unit, which has a connector device for electrically connecting the base unit, by way of the column, to at least one of the operator control unit and the additional data display unit.

11. The weighing scale of claim 7, wherein:
the means for connecting to the base unit means comprises, on the base unit, a first mounting location for the operator control unit and a second mounting location for the data display unit, for directly attachment to the base unit in the first configuration.

12. The weighing scale of claim 3, further comprising:
an operator control unit having a data display device and a data entry device, the operator control unit and the base unit each provided with means for selectively connecting, either mechanically or electrically, the operator control unit to the base unit in either the first or second configuration.

13. The weighing scale of claim 12, wherein:
the means for connecting means comprises further mounting locations for the operator control unit and the additional data display unit in the second configuration of the modular weighing scale an operator control unit can be arranged on one of the main surfaces of the base unit and/or a data display unit can be arranged on the other of said main surfaces.

14. The weighing scale of claim 1, comprising:
a printer, arranged for:
electrical connection to the base unit as a free-standing unit in the first configuration;
electrical and mechanical connection to the base unit as an attached unit by way of the column in the first configuration; or
direct mechanical and electrical connection to the base unit in the second configuration.

15. The weighing scale of claim 9, further comprising:
a counterweight, removably mounted in a space in the base unit to enhance the stability of the weighing scale against tipping over when the column is attached to the base unit.

16. The weighing scale of claim 15, wherein:
in the absence of the counterweight, the space provides a routing path for an electrical connection from the base unit to the operator control unit, and wherein the space can further be traversed by the suspension member from which the load receiver is suspended in the second configuration.

* * * * *